(12) United States Patent
Huang et al.

(10) Patent No.: US 8,129,672 B2
(45) Date of Patent: Mar. 6, 2012

(54) PHOTOSENSOR DEVICE WITH DARK CURRENT CANCELLATION

(76) Inventors: Chun-Hao Huang, Hsinchu (TW); Yao-Jen Tsai, Kaohsiung (TW)

( * ) Notice: Subject to any disclaimer, the term of this patent is extended or adjusted under 35 U.S.C. 154(b) by 160 days.

(21) Appl. No.: 12/784,784

(22) Filed: May 21, 2010

(65) Prior Publication Data
US 2011/0192958 A1    Aug. 11, 2011

(30) Foreign Application Priority Data
Feb. 11, 2010    (TW) .............................. 99104393 A

(51) Int. Cl.
G01J 1/44    (2006.01)
(52) U.S. Cl. .................................. 250/214 A; 356/323
(58) Field of Classification Search .............. 250/214 A, 250/214 C, 214 R; 356/323
See application file for complete search history.

(56) References Cited

U.S. PATENT DOCUMENTS

| | | | |
|---|---|---|---|
| 3,684,378 A * | 8/1972 | Lord .............................. | 356/323 |
| 5,912,463 A * | 6/1999 | Mizuno et al. ............ | 250/214 R |
| 7,323,672 B2 | 1/2008 | Liang et al. | |

FOREIGN PATENT DOCUMENTS

TW    550447    9/2003

* cited by examiner

Primary Examiner — Seung C Sohn
(74) Attorney, Agent, or Firm — Muncy, Geissler, Olds & Lowe, PLLC

(57) ABSTRACT

A photosensor device with dark current cancellation is disclosed. The photosensor device comprises a first and second photosensors, a first and second current replication circuits and a digital signal generator. The first photosensor has a first dark current but does not receive any photo signal. The second photosensor has a second dark current and receives a photo signal to generate photocurrent according to the photo signal. The first current replication circuit generates a replicated current according to the first dark current and injects the replicated current into the second photosensor for cancelling the second dark current from the second photosensor. The second photosensor is coupled to the second current replication circuit which generates charge and discharge currents according to the photocurrent of the second photosensor. The second current replication circuit is coupled to a digital signal generator which generates digital signals according to the charge and discharge functions, and the electrical characteristic of the digital signal is related to the intensity of the photo signal.

9 Claims, 4 Drawing Sheets

PHOTOSENSOR DEVICE WITH DARK CURRENT CANCELLATION

BACKGROUND OF THE INVENTION

1. Field of the Invention

The present invention relates to a photosensor technology, and in particular to a photosensor device with dark current cancellation.

2. Description of the Related Art

In optical application systems, photosensors, such as visible light sensors, infrared sensors, UV sensors, distance sensors and photo signal transmission sensors with optical fibers, can be usually used for converting photo signals into electrical signals. One kind of light sensor made of a photodiode still generates a dark current under no illumination. The dark current is a source of noise, thus it will affect the sensing result. The prior art of U.S. Pat. No. 7,323,672B2 discloses a light sensor structure with dark current compensation. As shown in FIG. 1, two light sensors 31, 32 are connected respectively with a first current-to-pulse converter 33 and a second current-to-pulse converter 34, wherein the light sensors 31, 32 comprise respectively two photodiodes D1, D2. Therefore, two dark currents are generated by the light sensors 31, 32 under no illumination, and the first current-to-pulse converter 33 and the second current-to-pulse converter 34 convert respectively the two dark currents into two pulse signals. Due to the fact that two identical pulse signals are generated from identical photodiodes, the number of the pulse signals are equal. Therefore, the pulse process unit 35 produces zero output voltage, and thereby the noise generated from the dark currents of the two photodiodes can be eliminated. However, in the technology of the prior art, two current to pulse converters 33 and 34 must be utilized in the circuit structure for eliminating the dark current, thus raising its production cost.

In the view of these above mentioned shortcomings in the prior art, the present invention provides a photosensor device with a simple construction and at least an advantage of dark current cancellation, for offering the benefits to the public.

SUMMARY OF THE INVENTION

A major objective of the present invention is to disclose a photosensor device with dark current cancellation. In the present invention, photoelectrical current signals can be converted into digital signals having electricity characteristic.

Further, in the photosensor device of the present invention, the dark current generated from a photodiode under no illumination is replicated by a current replication circuit, thus cancelling the other dark current generated from another photodiode receiving illumination, so that the noise brought from the dark current can be removed. Also, the photosensor device is such a simple circuit construction that its cost is reduced.

To achieve the abovementioned objectives, the present invention discloses a photosensor device with dark current cancellation, comprising a first photosensor, a second photosensor, a first current replication circuit, a second current replication circuit and a digital signal generator. The first photosensor has a first dark current but does not receive any photo signal; the second photosensor has a second dark current and receives a photo signal to generate a photocurrent based on the photo signal intensity. The first current replication circuit, which is coupled to the first photosensor and the second photosensor, is utilized to generate a replicated current for injecting into the second photosensor to cancel the second dark current. Wherein, the second dark current is equal to the replicated current based on the first dark current. The second photosensor, which is coupled to the second replication circuit, generates a charge current and a discharge current. The digital signal generator, which is coupled to the second replicated circuit, generates a digital signal according to a charge/discharge function as caused by the charge or discharge current. Moreover, the electrical characteristic of the digital signal is related to the intensity of the photo signal.

In the present invention, the first dark current produced by the first photosensor passes through the first current replication circuit, and then the first replication circuit generates a replicated current that is injected into the second photosensor. According to the above mentioned technical means, the second dark current generated by the second photosensor can be cancelled and the photocurrent related to the intensity of the photo signal in the second photosensor can be transmitted to the second current replication circuit and the digital signal generator, so as to generate the digital signal related to the received photo signal. Therefore, the present invention can achieve better photo-to-electric effect by cancelling the dark current effect of the photosensor.

The first current replication circuit mentioned above further comprises a current mirror circuit that is composed essentially of a plurality of P type transistors (PMOS) or N type transistors (NMOS).

The second replication circuit mentioned above further comprises current mirror circuits that composed essentially of a plurality of P type transistors (PMOS) or N type transistors (NMOS). The output terminals of second replication circuit are a charge terminal and a discharge terminal, wherein the charge terminal is used to supply the charge current for the digital signal generator and the discharge terminal is used to supply the discharge current for the same.

The digital signal generator mentioned above further comprises a first comparator, a second comparator, a SR flip-flop, a capacitor, a first switch element, a second switch element, a first reference voltage and a second reference voltage.

The positive terminal of the first comparator is coupled to the first reference voltage, while the negative terminal of the same is coupled to a common node of the first terminal of the capacitor, the first terminal of the first switch element and the first terminal of the second switch element. The negative terminal of the second comparator is coupled to the second reference voltage, while the positive terminal of the same is coupled to a common node of the first terminal of the capacitor, the first terminal of the first switch element, and the first terminal of the second switch element. The first reference voltage is greater than the second reference voltage. The second terminal of the capacitor is coupled to ground. The second terminal of the first switch element is coupled to the charge terminal of the second current replication circuit, while the second terminal of the second switch element is coupled to the discharge terminal of the second current replication circuit. The SR flip-flop has a first input terminal, a second input terminal, a first output terminal and a second output terminal, wherein the first input terminal is coupled to the output terminal of the first comparator, and the second input terminal is coupled to the output terminal of the second comparator. The result that is determined electrically by the SR flip-flop is output to the first output terminal and the second output terminal. The first output terminal and the second output terminal respectively control the first switch element and the second switch element, such that the second current replication circuit performs the charge/discharge functions to the common node connected with the capacitor, the first switch element and the second switch element. The voltage of the common node is an analog voltage. When the analog voltage is higher than the first reference voltage, the digital signal of the first output terminal is at a high voltage level and controls the first switch element to be opened. At the same time, the digital signal of the second output terminal is at a low voltage level, such that the second switch element is controlled to be closed. Therefore, the capacitor can be discharged by the second replication current. When the analog voltage is between the first reference voltage and the second reference voltage, the voltage levels of the digital signal at the first output terminal and the second output terminal are maintained at the preceding voltage level. Therefore, the capacitor continues to be charged or discharged by the second current replication circuit. When the analog voltage is lower than the second reference voltage, the digital signal of the first output terminal is at a low voltage level, so that the first switch element is controlled to be closed, and the digital signal of the second output terminal is at a high voltage level, such that the second switch element is controlled to be opened, thus the capacitor is charged by the second current replication circuit. Wherein, the digital signal from the first output terminal or the second output terminal of the SR flip-flop is the output terminal of the digital signal generator.

In order to understand the above mentioned or other objectives, characteristics, and advantages more clearly, a preferred embodiment and the related figures are disclosed in the following.

DETAILED DESCRIPTION OF THE INVENTION

Figure 1:
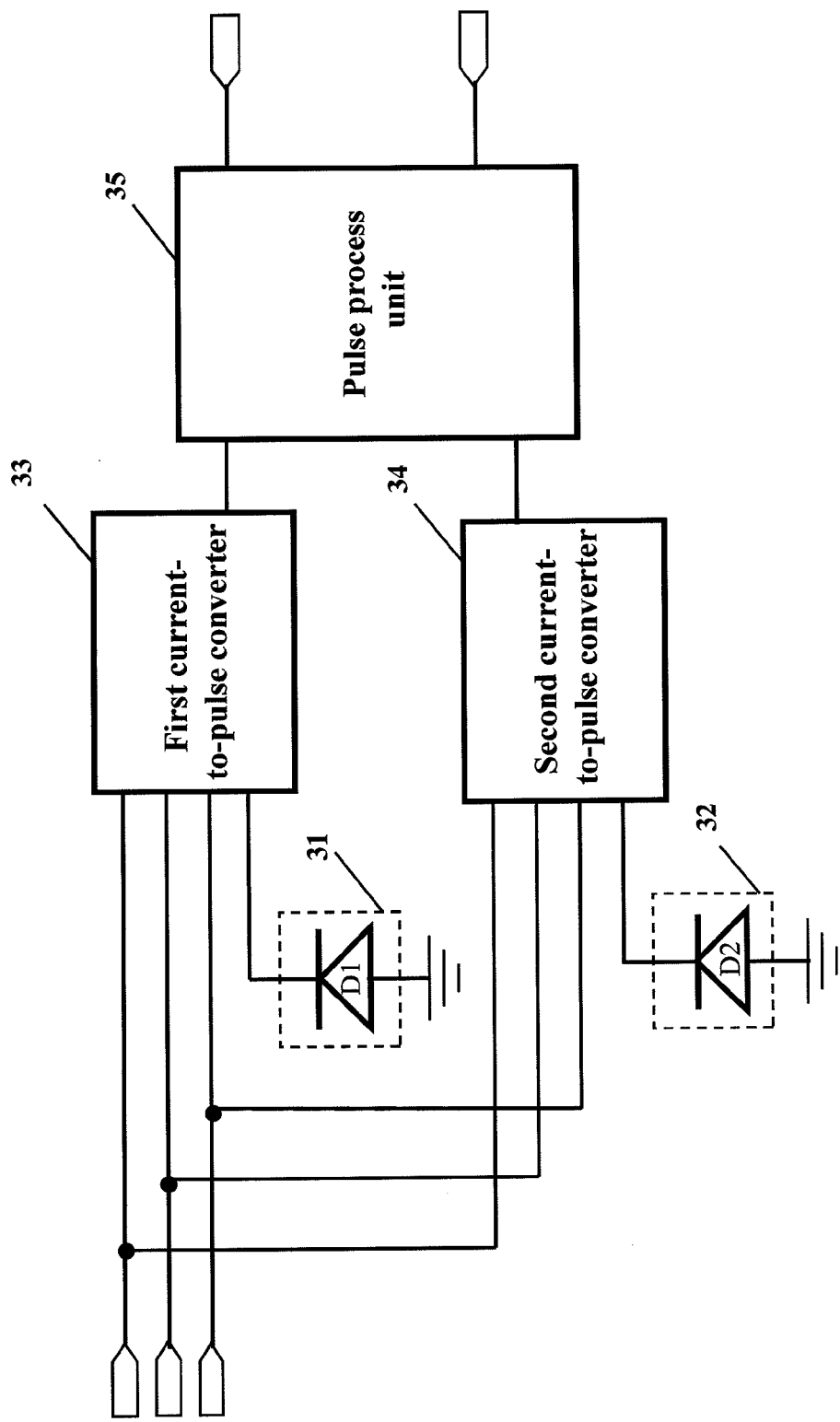
FIG. 1 is a block diagram according to the prior art.
Figure 2:
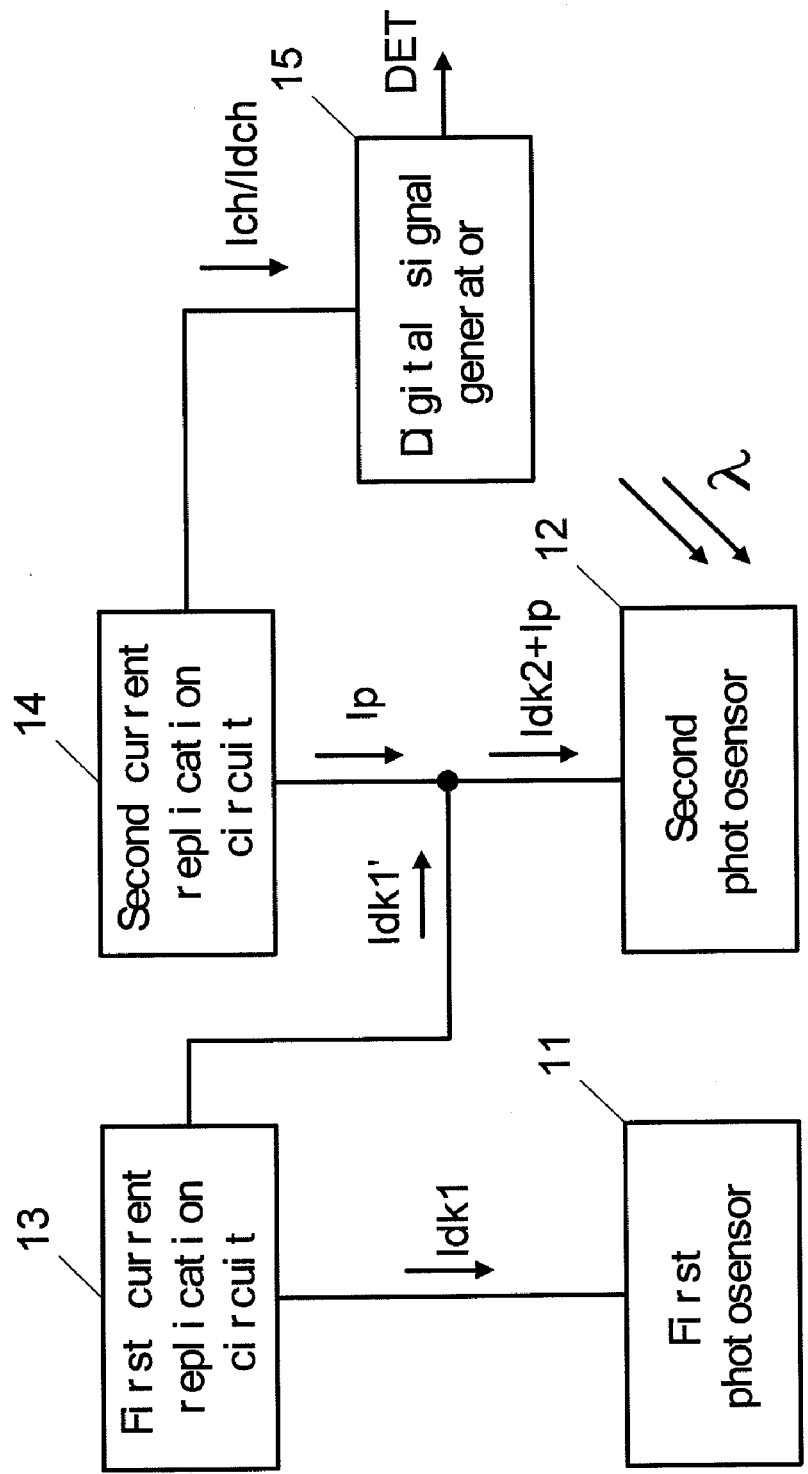
FIG. 2 is a block diagram of a photosensor device with dark current cancellation according to the preferred embodiment of the present invention.

FIG. 2 is a block diagram of a photosensor device with dark current cancellation according to the preferred embodiment of the present invention. Refer to FIG. 2. The photosensor device comprises a first photosensor 11, a second photosensor 12, a first current replication circuit 13, a second current replication circuit 14 and a digital signal generator 15. The first photosensor 11 has a first dark current Idk1 but it does not receive any photo signal; the second photosensor 12 has a second dark current Idk2 and it receives a photo signal λ to generate a photocurrent Ip based on the photo signal λ. One terminal of the first current replication circuit 13 is connected to the first photosensor 11, and the other terminal is connected to the second photosensor 12. The replicated current Idk1', which is generated according to the first dark current Idk1, injects into the second photosensor 12 for eliminating the second dark current Idk2, wherein the second dark current Idk2 is equal to the replicated current Idk1' of the first dark current Idk1. The second photosenor 12 is also coupled to the second replicated circuit 14. The second current replication circuit 14 generates a charge current Ich and a discharge current Idch according to the photocurrent Ip of the second photosensor 12. The digital signal generator 15 coupled to the second current replication current 14 performs a charging function and a discharging function according to the charge current Ich and the discharge current Idch for generating a digital signal DET. And the electrical characteristic of the digital signal DET is related to the intensity of the photo signal λ. Because the second dark current Idk2 is equal to the replicated current Idk1', the second photosensor 12 only supplies the photocurrent Ip to the second current replicated circuit 14, and hence the second dark current Idk2 generated by the second photosensor 12 can be cancelled.

Figure 3:
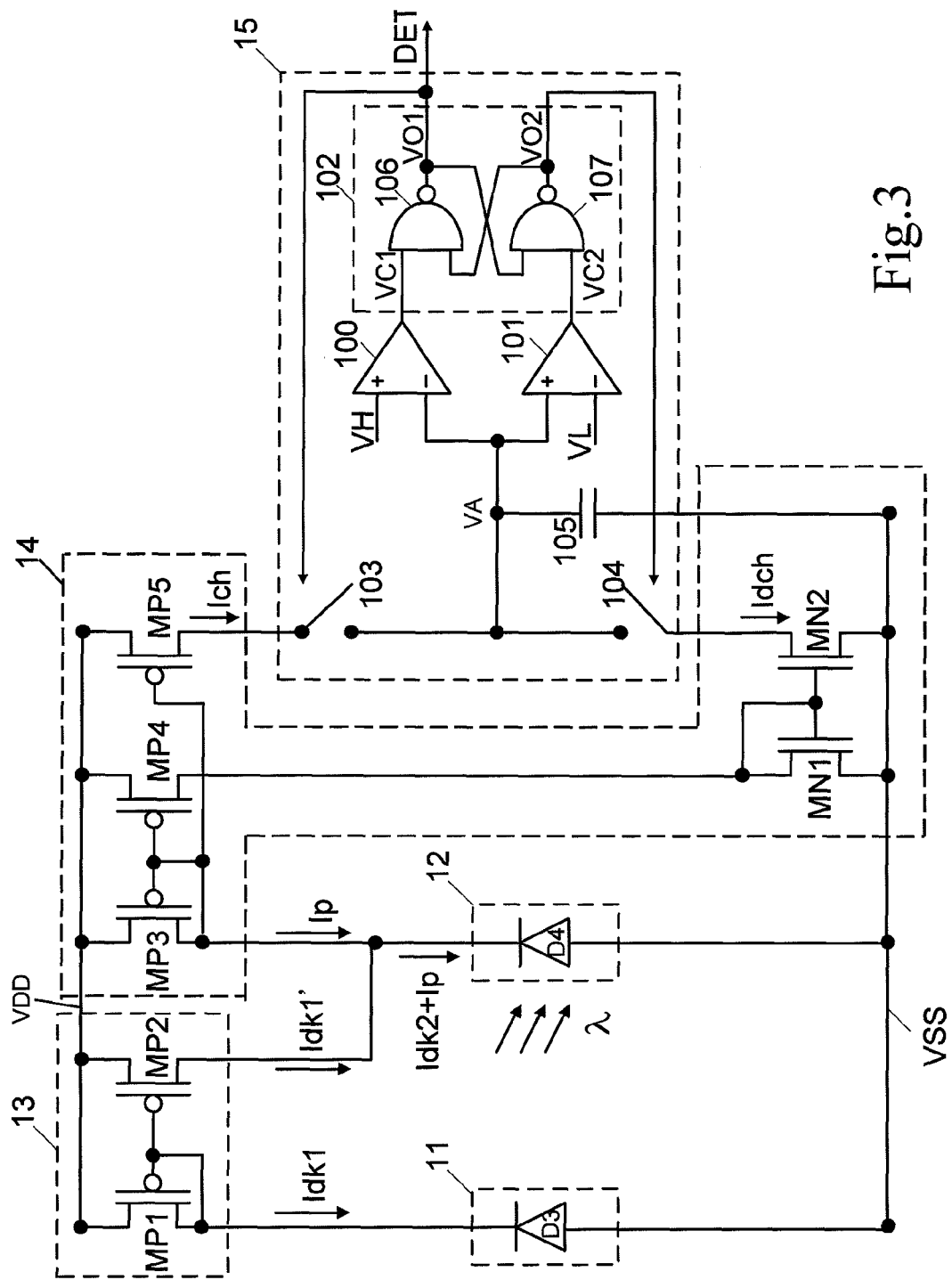
FIG. 3 is a circuit diagram of the embodiment of the photosensor device as referring to FIG. 2.

FIG. 3 is a circuit diagram of a photosensor device according to an embodiment of the present invention. Refer to FIG. 3. The photosensor device comprises a first photosensor 11, a second photosensor 12, a first current replicated circuit 13, a second current replicated circuit 14 and a digital signal generator 15. In the embodiment, the first photosensor 11 that is a photo-to-electric element comprises a first photodiode D3, and the second photosensor 12 that is a photo-to-electric element comprises a second photodiode D4. The first current replication circuit 13 comprise a first current mirror circuit which is composed of P type transistors MP1 and MP2, and the second current replication circuit 14 comprises a second current mirror circuit, a third current mirror circuit and a fourth current mirror circuit, wherein the second current mirror circuit is composed of two P type transistors MP3 and MP4; the third current mirror circuit is composed of two P type transistors MP3 and MP5; the fourth current mirror circuit is composed of two N type transistors MN1 and MN2. Because P type transistors are adopted in the first, second and third current mirror circuits, the current that is replicated and the current that is formed by replicating are the output type of the current mirror circuits; whereas, because N type transistor is adopted in the fourth current mirror circuit, the current that is replicated and the current that is formed by replicating are the draw type. The first replicated current Idk1' is produced by the first current mirror circuit according to the first dark current Idk1, and the replicated Idk1' is equal to the second dark current Idk2. The third current mirror circuit generates the charge current Ich according to the photocurrent Ip, and the second current mirror circuit and the fourth current mirror circuit generate the discharge current Idch according to the photocurrent Ip.

The digital signal generator 15 comprises a first comparator 100, a second comparator 101, a SR flip-flop 102, a capacitor 105, a first switch element 103, a second switch element 104, a first reference voltage VH, and a second reference voltage VL, wherein the SR flip-flop 102 is composed of two NANDs 106 and 107. The positive terminal of the first comparator 100 is coupled to the first reference voltage VH, and the negative terminal of the same is coupled to a common node VA connected with a terminal of a capacitor 105, a terminal of a first switch element 103 and a terminal of a second switch element 104. The negative terminal of the second comparator 101 is coupled to the second reference voltage VL, and the positive terminal of the same is coupled to the common node VA, wherein the first reference voltage VH is greater than the second reference voltage VL. The other terminal of the capacitor 105 is connected to ground VSS. The other terminal of the first switch element 103 is coupled to the charge current Ich of the second current replication circuit 14. The other terminal of the second switch element 104 is coupled to the discharge current Idch of the second current replication circuit 14. The SR flip-flop 102 has a first input terminal VC1, a second input terminal VC2, a first output terminal VO1, a second output terminal VO2. The first output terminal VO1 and the second output terminal VO2 of the SR flip-flop 102 control respectively the first switch element 103 and the second switch element 104, such that the common node VA can be charged/discharged with the charge/discharge current Ich/Idch.

The voltage at the common node VA is an analog voltage. When the analog voltage of the common node VA is greater than a first reference voltage VH, the digital signal of the first output VO1 is at a high level, and then the first switch element 103 is controlled to be opened. In the same situation mentioned above, the digital signal of the second output VO2 is at a low level, and then the second switch element 104 is controlled to be closed, such that the discharged current Idch of the second current replication circuit 14 performs discharge function to the capacitor 105. When the analog voltage is between the first reference voltage VH and the second reference voltage VL, the preceding condition of the digital signal of the first output terminal VO1 and the second output terminal VO2 is maintained, such that the capacitor 105 continues to be charged/discharged by the second current replication circuit 14. In the case that the analog voltage is lower than the second reference voltage VL, the digital signal of the first output terminal VO1 is at a low level, and then the first switch element 103 is controlled to be closed. Also, the digital signal of the second output terminal VO2 is at a high level in the same case, and then the second switch element 104 is controlled to be opened, such that the capacitor 105 is charged by the charging current Ich of the second current replication circuit 14. The charge/discharge functions described above are performed repeatedly. The digital signals generated by the first output terminal VO1 or the second output terminal VO2 of the SR flip-flop 102 are considered as the output signals of the digital signal generator 15.

The digital signals of the first output terminal VO1 or the second output terminal VO2 are also the digital signal DET output from the photosensor device 2 according to the present invention. Moreover, the electrical characteristic of the digital signal is related to the intensity of the photo signal λ.

Figure 4:
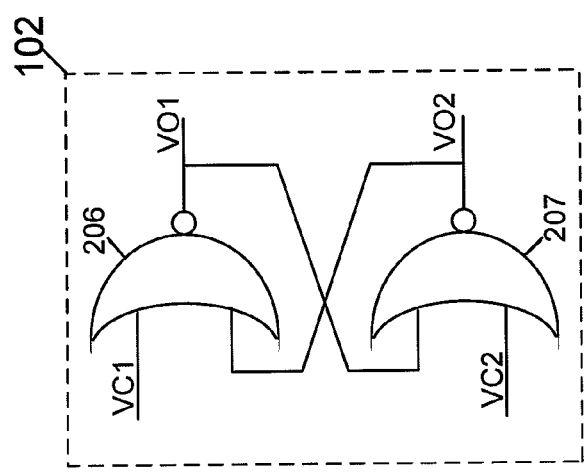
FIG. 4 is a circuit diagram of the other embodiment of the SR flip-flop according to the present invention.

FIG. 4 shows a circuit diagram of another embodiment of the SR flip-flop 102 in the photosensor device according to the present invention. Wherein, the SR flip-flop 102 is composed of two NORs 206 and 207.

To sum up, the present invention discloses the technical means that the dark current Idk1 of the first photosensor 11 is utilized to eliminate the dark current Idk2 of the second photosensor 12 and the photocurrent Ip of the second photosensor 12 is converted into the digital signal DET by the digital signal generator 15 in the photosensor device. Furthermore, the photosensor device of the present invention requires only one digital signal converter (digital signal generator) to offset the dark current, and the output digital signal can be more accurately. Also, the cost of the circuit construction is low, so that the present invention has strong competitiveness in all kinds of related fields.

Those described above are only the preferred embodiments to clarify the technical contents and characteristic of the present invention in enabling the persons skilled in the art to understand, make and use the present invention. However, they are not intended to limit the scope of the present invention. Any modification and variation according to the spirit of the present invention can also be included within the scope of the claims of the present invention.

What is claimed is:

1. A photosensor device with dark current cancellation, comprising:
    a first photosensor, having a first dark current but not receiving any photo signal;
    a first current replication circuit, said first current replication circuit is coupled to said first photosensor, said first current replication circuit generates a replicated current based on said first dark current;
    a second photosensor coupled to said first current replication circuit for acquiring said replicated current, said second photosensor having a second dark current receives said photo signal to generate a photocurrent based on intensity of said photo signal, wherein said second dark current is equal to said replicated current, so that said second dark current is offset by said replicated current;
    a second current replication circuit, said second current replication circuit is coupled to said second photosensor, said second current replication circuit generates a charge current and a discharge current both based on said photocurrent; and
    a digital signal generator, coupled to said second current replication circuit, said digital signal generator generates a digital signal based on said charge current and said discharge current to perform charging and discharging functions, and an electricity characteristic of said digital signal is related to intensity of said photo signal.

2. The photosensor device with dark current cancellation according to claim 1, wherein said first photosensor or said second photosensor is a photo-to-electric element.

3. The photosensor device with dark current cancellation according to claim 2, wherein said photo-to-electric element is a photodiode.

4. The photosensor device with dark current cancellation according to claim 1, wherein said first current replication current comprises a first current mirror circuit that is composed essentially of a plurality of P-type or N-type transistors, and said first current mirror circuit generates said replication current to inject into said second photosensor based on said first dark current for eliminating said second dark current.

5. The photosensor device with dark current cancellation according to claim 1, wherein said second current replication circuit comprises a plurality of current mirror circuits composed essentially of a plurality of P type and N type transistors, and said second current replication circuit generates said charge current and said discharge current based on said photocurrent to perform charge/discharge functions to said digital signal generator.

6. The photosensor device with dark current cancellation according to claim 1, wherein said digital signal generator comprises
    a first comparator, coupled to a first reference voltage;
    a second comparator, coupled to a second reference voltage, wherein said first reference voltage is higher than said second reference voltage;
    a capacitor, having a common node to be coupled to said first comparator and said second comparator, wherein said common node has an analog voltage comprises three kind of voltage levels that include a high voltage level higher than said first reference voltage, a low voltage level lower than said second reference voltage and a common voltage level between said first reference voltage and said second reference voltage;
    a plurality of switch elements, comprising a first switch element and a second switch element, wherein said switch elements coupled to said second current replicated circuit and said capacitor for controlling said charge current and said discharge current to perform charge/discharge functions; and
    a SR flip-flop, electrically connected to said switch elements, said switch elements are controlled to be on or off by said SR flip-flop according to said analog voltage, and said capacitor is charged or discharged with said charge current or said discharge current so that said SR flip-flop generates said digital signal according to said charge current and said discharge current.

7. The photosensor device with dark current cancellation according to claim 6, wherein when said analog voltage is higher than said first reference voltage, said first switch element is controlled to be opened by said SR flip-flop and said second switch element is controlled to be closed by said SR flip-flop, so that said capacitor is discharged with said discharge current, and said SR flip-flop generates a high-level digital signal as said digital signal according to said discharged current;

when said analog voltage is lower than said second reference voltage, said first switch element is controlled to be closed by said SR flip-flop and said second switch element is controlled to be opened by said SR flip-flop, so that said capacitor is charged with said charge current, and said SR flip-flop generates a low-level digital signal as said digital signal according to said charged current; and when said analog voltage is between said first reference voltage and said second reference voltage, said switch elements are controlled by said SR flip-flop to maintain a preceding condition, so that a original signal level of said digital signal is maintained.

8. The photosensor device with dark current cancellation according to claim 6, wherein said SR flip-flop is a NAND SR flip-flop or a NOR SR flip-flop.

9. The photosensor device with dark current cancellation according to claim 6, wherein said SR flip-flop has a first output terminal that controls said first switch element and a second output terminal that controls said second switch element, for charging or discharging said capacitor.

\* \* \* \* \*